(12) United States Patent
Purpura (10) Patent No.: US 7,969,879 B2
(45) Date of Patent: Jun. 28, 2011

(54) SUPPORTING NETWORK SELF-HEALING AND OPTIMIZATION

(75) Inventor: William J. Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 652 days.

(21) Appl. No.: 11/702,746

(22) Filed: Feb. 6, 2007

(65) Prior Publication Data

US 2007/0274337 A1   Nov. 29, 2007

Related U.S. Application Data

(63) Continuation-in-part of application No. 11/367,240, filed on Mar. 3, 2006.

(51) Int. Cl.
*H04L 12/26* (2006.01)

(52) U.S. Cl. ............ 370/230.1; 370/229; 370/230; 370/241; 370/252; 709/223; 709/227

(58) Field of Classification Search .......... 370/241, 370/252, 464, 465, 468; 709/223–226
See application file for complete search history.

(56) References Cited

U.S. PATENT DOCUMENTS

| | | |
|---|---|---|
| 6,289,382 B1 | 9/2001 | Bowman-Amuah .......... 709/226 |
| 6,434,628 B1 | 8/2002 | Bowman-Amuah ............ 714/48 |
| 6,459,683 B2 | 10/2002 | Busuioc et al. ............... 370/270 |
| 6,754,230 B2 | 6/2004 | Purpura |
| 6,801,764 B2 | 10/2004 | Purpura et al. |
| 6,980,546 B2 | 12/2005 | Purpura et al. |
| 7,154,859 B2 | 12/2006 | Purpura |
| 7,245,635 B2 * | 7/2007 | Mo et al. ........................ 370/468 |
| 7,307,954 B1 | 12/2007 | Strandberg et al. ........... 370/235 |
| 7,441,021 B1 | 10/2008 | Perry .............................. 709/223 |
| 2002/0053020 A1 * | 5/2002 | Teijido et al. .................. 713/153 |
| 2002/0067729 A1 * | 6/2002 | Fukuda et al. ........... 370/395.21 |
| 2002/0073062 A1 | 6/2002 | Cerami et al. ..................... 707/1 |
| 2003/0112766 A1 | 6/2003 | Riedel et al. .................. 370/252 |
| 2003/0158915 A1 * | 8/2003 | Gebhart ........................ 709/219 |
| 2004/0100901 A1 | 5/2004 | Bellows ........................ 370/230 |
| 2004/0174822 A1 * | 9/2004 | Bui ................................ 370/252 |
| 2005/0064820 A1 | 3/2005 | Park et al. ................... 455/67.11 |
| 2005/0143013 A1 | 6/2005 | Jha .................................. 455/69 |
| 2005/0169186 A1 | 8/2005 | Qiu et al. ....................... 370/242 |
| 2006/0109786 A1 | 5/2006 | Abdel-Kader et al. ....... 370/232 |
| 2006/0165027 A1 * | 7/2006 | Heden ........................... 370/328 |

(Continued)

OTHER PUBLICATIONS

Procedure for Interoperability and Supportability of Information Technology and National Security Systems, Department of Defense Instruction, No. 4630.8, Jun. 30, 2004.

*Primary Examiner* — Anh-Vu H Ly
*Assistant Examiner* — Charles C Jiang
(74) *Attorney, Agent, or Firm* — Harness, Dickey & Pierce, P.L.C.

(57) ABSTRACT

A method of managing a network includes configuring nodes and applications of the network to refer to the same framework of predefined network capabilities. Each of the applications is configured to implement one or more of the capabilities. Each of the applications also is configured to negotiate, as to each of the capabilities, with the nodes to obtain a network resource to support the capabilities. Each node is configured to negotiate, after an application obtains a network resource, with other nodes to optimize network resource allocation. This method provides a framework for application self-healing and network optimization that can improve network performance.

20 Claims, 8 Drawing Sheets

U.S. PATENT DOCUMENTS

| | | | |
|---|---|---|---|
| 2006/0193265 A1 | 8/2006 | Simionescu et al. | 370/254 |
| 2006/0198316 A1 | 9/2006 | Bhagwat et al. | 370/252 |
| 2006/0229080 A1* | 10/2006 | Khan et al. | 455/450 |
| 2007/0071028 A1 | 3/2007 | Dorris et al. | 370/466 |
| 2008/0019275 A1 | 1/2008 | Mudireddy et al. | 370/235 |
| 2008/0049755 A1* | 2/2008 | Gannon et al. | 370/395.1 |
| 2008/0219176 A1* | 9/2008 | Yamada | 370/252 |
| 2009/0215411 A1 | 8/2009 | Tucker et al. | 455/90.2 |

* cited by examiner

| Infrastructure NCO Capability | Performance Parameter | | | | Resource Parameter | | | | Application Priority | | | | Capability Relationship | | | | |
|---|---|---|---|---|---|---|---|---|---|---|---|---|---|---|---|---|---|
| | PP1 | PP2 | PP3 | PP4 | R1 | R2 | R3 | R4 | P1 | P2 | P3 | P4 | IO | IA | DM | KM | CCI |
| Interoperability | F1 X% / F2 Y% | F1 / F2 | | | | | | | | | | | | | | | |
| Information Assurance | 1  100% | | | | | | | | | | | | 1 | 2 | | | |
| Data Management | | | | | | | | | | | | | 1 | 2 | 3 | | |
| Knowledge Management | | | | | | | | | | | | | 1 | 2 | 3 | 4 | |
| Collaboration in Communities of Interest | | | | | | | | | | | | | 1 | 2 | 3 | 4 | 5 |

| Infrastructure NCO Capability | KPP | | | | Resource Parameter | | | | Mission Priorities | | | | Capability Relationship | | | | |
|---|---|---|---|---|---|---|---|---|---|---|---|---|---|---|---|---|---|
| | KPP1 | KPP2 | KPP3 | KPP4 | CPU | Store | Band | I/O | P1 | P2 | P3 | P4 | IO | IA | DM | KM | CCI |
| Interoperability | F1... F2... F3... | | | | (X,X,X) (X,X,X) (X,X,X) | | | | X | | | | | | | | |
| Information Assurance | | | | | | | | | | | | | 1 | 2 | | | |
| Data Management | | | | | | | | | | | | | 1 | 2 | 3 | 4 | |
| Knowledge Management | | | | | | | | | | | | | 1 | 2 | 3 | 4 | |
| Collaboration in Communities of Interest | | | | | | | | | | | | | 1 | 2 | 3 | 4 | 5 |

| Node 1<br>F-15 attack A/C | Infrastructure NCO Capability | Targ DT | Res | AU | Ency | Trans | WebT | | |
|---|---|---|---|---|---|---|---|---|---|
| | | | | | | | Total Impact For This Node | | |
| | Application 1: targeting program | | | | | | Application #1 Impact | | |
| | Interoperability | F1: SV,<br>F2: Ph,<br>F3: PT | F1: HR,<br>F2: .HR,<br>F3: T | | | | | | |
| | Information Assurance | | | F1:B | F1:NES<br>F1: SW | | | | |
| | Data Management | | | | | F1: VT<br>V2:TT | | | |
| | Knowledge Management | N/A | N/A | N/A | N/A | N/A | N/A | N/A | N/A |
| | Collaboration Communities of Interest | N/A | N/A | N/A | N/A | N/A | N/A | N/A | N/A |
| | Application 2: Virtual Collaboration Community | Critical KPP | | | | | | | |
| | Infrastructure NCO Capability | Targ DT | Res | AU | Ency | Trans | WebT | | |
| | | | | | | | Application #2 Impact | | |
| | Interoperability | F1: | F1: HR | | | | | | |
| | Information Assurance | | | F1:B | F1:NES | | | | |
| | Data Management | N/A | N/A | N/A | N/A | N/A | N/A | N/A | N/A |
| | Knowledge Management | N/A | N/A | N/A | N/A | N/A | N/A | N/A | N/A |
| | Collaboration Communities of Interest | | | | | | F1:B | | |
| Node 2<br>AWCS A/C | Infrastructure NCO Capability | Targ DT | Res | AU | Ency | Trans | WebT | | |
| | Application 1: Virtual Collaboration Community | | | | | | Application #1 Impact | | |
| | Interoperability | F1: | F1: HR | | | | | | |
| | Information Assurance | | | F1:B | F1:NES | | | | |
| | Data Management | N/A | N/A | N/A | N/A | N/A | N/A | N/A | N/A |
| | Knowledge Management | N/A | N/A | N/A | N/A | N/A | N/A | N/A | N/A |
| | Collaboration Communities of Interest | | | | | | F1:B | | |
| Node 3<br>Ground Sensor | Infrastructure NCO Capability | Targ DT | Res | AU | Ency | Trans | WebT | | |
| | Application 1: targeting data | | | | | | Application #1 Impact | | |
| | Interoperability | F1: SV | F1: HR | | | | | | |
| | Information Assurance | | | F1:B | F1:NES | | | | |
| | Data Management | | | | | F1: VT | | | |
| | Knowledge Management | N/A | N/A | N/A | N/A | N/A | N/A | N/A | N/A |
| | Collaboration Communities of Interest | N/A | N/A | N/A | N/A | N/A | N/A | N/A | N/A |

| Master Mission Resource Matrix | | | | | | | Total Environment Surplus Resource Availability | | | | | | |
|---|---|---|---|---|---|---|---|---|---|---|---|---|
| BW | RAM | 802 I/O | DM I/O | Ency | CPU | WebT | BW | RAM | 802 I/O | DM I/O | Ency | CPU | WebT |
| Sum | Sum | Sum | Sum | Sum | Sum | Sum | 30.0% | 34.5% | 75.0% | 100.0% | 60.0% | 99.6% | 90.0% |
| Resource Parameter | | | | | | | Overall Resource Usage | | | | | | |
| BW | RAM | 802 I/O | DM I/O | Ency | CPU | WebT | BW | RAM | 802 I/O | DM I/O | Ency | CPU | WebT |
| | | | | | | | 32.5% | 30.3% | 12.5% | 0.0% | 20.0% | 0.2% | 0.0% |
| | | | | | | | 25.0% | 25.3% | 12.5% | 0.0% | 20.0% | 0.2% | 0.0% |
| F1: 10, F2: 1, F3: .25 | F1: 1G, F2: .1G, F3: .1G | F1B, F2:B, F3:B | F3:B | | | | 5.0% | 5.0% | 12.5% | | | | |
| F1: 1M, F2: .1K | F1: 1M F2: .1K | | | F1:B, F2:B, | | | 20.0% | 20.0% | | | 10.0% | | |
| | F1: .25M | | | | F1: .5 M F2: .25k | | | 0.3% | | | 10.0% | 0.2% | |
| N/A | N/A | N/A | N/A | N/A | N/A | N/A | N/A | N/A | N/A | N/A | N/A | N/A | N/A |
| N/A | N/A | N/A | N/A | N/A | N/A | N/A | N/A | N/A | N/A | N/A | N/A | N/A | N/A |
| Resource Parameter | | | | | | | Overall Resource Usage | | | | | | |
| BW | RAM | 802 I/O | DM I/O | Ency | CPU | WebT | BW | RAM | 802 I/O | DM I/O | Ency | CPU | WebT |
| | | | | | | | 7.5% | 5.0% | 0.0% | 0.0% | 0.0% | 0.0% | 0.0% |
| F1: 256K | F1:B | | | | | | 2.50% | | | | | | |
| F1: 1M | F1: 1M | | | F1:B | | | 5.0% | 5.0% | | | | | |
| N/A | N/A | N/A | N/A | N/A | N/A | N/A | N/A | N/A | N/A | N/A | N/A | N/A | N/A |
| N/A | N/A | N/A | N/A | N/A | N/A | N/A | N/A | N/A | N/A | N/A | N/A | N/A | N/A |
| F1: 1M | F1: .25M | | | | | F1:B | 5.0% | 5.0% | | | | | 0.1 |
| BW | RAM | 802 I/O | DM I/O | Ency | CPU | WebT | BW | RAM | 802 I/O | DM I/O | Ency | CPU | WebT |
| Total Impact For This Node | | | | | | | 12.5% | 10.0% | 0.0% | 0.0% | 0.0% | 0.0% | 10.0% |
| | | | | | | | 12.5% | 10.0% | 0.0% | 0.0% | 0.0% | 0.0% | 10.0% |
| F1: 256K | F1:B | | | | | | 2.50% | | | | | | |
| F1:1M | F1:1M | | | F1:B | | | 5.0% | 5.0% | | | | | |
| N/A | N/A | N/A | N/A | N/A | N/A | N/A | N/A | N/A | N/A | N/A | N/A | N/A | N/A |
| N/A | N/A | N/A | N/A | N/A | N/A | N/A | N/A | N/A | N/A | N/A | N/A | N/A | N/A |
| F1: 1M | F1:.25M | | | | | F1:B | 5.0% | 5.0% | | | | | 0.1 |
| BW | RAM | 802 I/O | DM I/O | Ency | CPU | WebT | 25.0% | 25.3% | 12.5% | 0.0% | 20.0% | 0.2% | 0.0% |
| | | | | | | | 25.0% | 25.3% | 12.5% | 0.0% | 20.0% | 0.2% | 0.0% |
| F1: 10 | F1: 1G | F1B | F3:B | | | | 5.0% | 5.0% | 12.5% | | | | |
| F1:1M | F1:1M | | | F1:B | | | 20.0% | 20.0% | | | 10.0% | | |
| | F1:.25M | | | | F1:.5 | | | 0.3% | | | 10.0% | 0.2% | |
| N/A | N/A | N/A | N/A | N/A | N/A | N/A | N/A | N/A | N/A | N/A | N/A | N/A | N/A |
| N/A | N/A | N/A | N/A | N/A | N/A | N/A | N/A | N/A | N/A | N/A | N/A | N/A | N/A |

Fig. 7B ially predefined for the one or more application capabilities. Each node is further configured to, for each capability, determine a cumulative value of resource allocation to the applications, and negotiate, for each capability, with other nodes to optimize the cumulative value.

SUPPORTING NETWORK SELF-HEALING AND OPTIMIZATION

CROSS-REFERENCE TO RELATED APPLICATIONS

This application is a continuation-in-part of U.S. patent application Ser. No. 11/367,240 filed on Mar. 3, 2006, the disclosure of which is incorporated herein by reference in its entirety. This application is also related to U.S. patent application Ser. No. 11/702,745 filed Feb. 6, 2007, and U.S. patent application Ser. No. 11/702,747 filed Feb. 6, 2007, filed on the same date as this application, the disclosures of which are incorporated herein by reference in their entirety.

FIELD

The present disclosure relates generally to communication and electronic data exchange networks and more particularly (but not exclusively) to methods and systems for supporting network self-healing and optimization in network-centric operations and/or other network environments, including but not limited to system-of-systems environments.

BACKGROUND

The statements in this section merely provide background information related to the present disclosure and may not constitute prior art.

As communication and electronic data exchange network environments become increasingly complex, chances increase for failure of networks and/or nodes supporting the networks. Factors such as weather, equipment breakdown and mobility of network nodes are common causes of network capability degradation. In network-centric operations (NCO), it is highly desirable to maintain a good operational environment.

SUMMARY

The present disclosure, in one implementation, is directed to a method of managing a network including a plurality of nodes and a plurality of applications of the nodes. The method includes configuring a plurality of nodes and a plurality of applications of the network to refer to the same framework of predefined network capabilities. Each of the applications is configured to implement one or more of the capabilities. Each of the applications also is configured to negotiate, as to each of the one or more capabilities, with the nodes to obtain a network resource to support the one or more capabilities. The method further includes configuring each node to negotiate, after an application obtains a network resource, with other nodes to optimize network resource allocation.

In another implementation, the disclosure is directed to a network including a plurality of nodes and a plurality of applications of the nodes. Each node and application is configured to refer to the same framework of predefined network capabilities. Each application is further configured to implement one or more of the capabilities subject to one or more performance parameters predefined for the one or more application capabilities. Each node is further configured to negotiate, as to each of the capabilities, with other nodes to obtain network resources to support one or more of the capabilities in accordance with one or more of the one or more performance parameters. Each node also is further configured to negotiate, as to each capability, with other nodes to optimize network resource allocation after a network resource is obtained to support one or more of the capabilities.

In another implementation, the disclosure is directed to a network including a plurality of nodes and a plurality of applications of the nodes. Each node and application is configured to refer to the same framework of predefined network capabilities. Each application is further configured to implement one or more of the capabilities subject to one or more performance parameters predefined for the one or more application capabilities. Each node is further configured to, for each capability, determine a cumulative value of resource allocation to the applications, and negotiate, for each capability, with other nodes to optimize the cumulative value.

In yet another implementation, the disclosure is directed to a method of optimizing a network including a plurality of applications. For each application, one or more performance parameters are specified for each capability attributed to the application from a predefined set of capabilities, and for each attributed capability of the application, one or more network resources are assigned to the application. For each capability in the predefined set, a cumulative value of resource usage is determined for each network resource assigned to the applications. For one capability in the predefined set, a functionality level of one of the performance parameters is modified to optimize the cumulative value. In such manner, a node can negotiate with a network environment so that other nodes may, in real time, be optimized for their own network resource allocation based, for example, on their assigned priorities and minimum capability needs to maintain their own application success probabilities.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7B is a second portion of the control/resource matrix shown in FIG. 7A.

DETAILED DESCRIPTION

The following description is merely exemplary in nature and is not intended to limit the present disclosure, application, or uses.

Although various implementations of the present disclosure are described with reference to network-centric operations (NCO) and military applications, the disclosure is not so limited. The disclosure may be implemented relative to many different networks and network-centric environments, including but not limited to various enterprise systems and non-military applications.

It is highly desirable for NCO devices, systems and equipment to be and remain interoperable, e.g., during battle conditions. However, although such systems might be introduced into battle conditions with specific NCO capability, as battle progresses, the impact of battle typically can cause degradation of data streams and communications links. Thus the chance that the planned NCO capability effectiveness would be maintained can quickly diminish. If a key link fails in a stovepipe system, a total loss of planned-for capabilities can result.

It is contemplated that enterprises will be called on to run applications in a NCO environment using network resources from a plurality of networks, e.g., to support a specific mission. Such applications might provide network capabilities as well as require network capabilities that might not be adequate and/or available, e.g., in the current network of a mission commander. Furthermore, resources, nodes and applications may be constantly changing. Devices may fail, nodes may enter and leave a network, and applications may run in an ad-hoc manner, competing for resources.

Although it is highly desirable to ensure that network capabilities are available to support a mission, enterprises might not provide information in the same manner with respect to what capabilities are needed or provided. Furthermore, when degradation occurs in a NCO environment, it frequently is characterized in terms of a component failure rather than a degradation of capability. It can be difficult to assess a total impact across all applications in a network as to capabilities to support a mission. It can be even more difficult to fix and optimize a NCO environment without an appropriate characterization of the NCO capabilities.

In U.S. patent application Ser. No. 11/367,240 filed on Mar. 3, 2006, the disclosure of which is incorporated herein by reference in its entirety, control modules are described which may arbitrate application, device and network capability requirements. In such manner, conflict may be resolved and effectiveness may be optimized with respect to, e.g., processing, storage, and communication links. Needs of NCO capabilities may be balanced to maximize overall probability of effectiveness of intended NCO capabilities.

In various implementations of the present disclosure, different enterprises in a NCO environment may provide diverse resources, nodes, and applications to the environment to achieve a specific mission. Resources may include devices such as servers, processors and security devices as well as substantially any other asset or application required to enable a NCO capability needed to accomplish a task/mission. Nodes on a network may be, e.g., sensors, effectors, or command and control points which may include aircraft, ships, ground force radios, satellites, and/or other entities that part of the network.

In various implementations and as further described below, self-healing capability effectiveness assurance (CEA) may be provided as to each of a plurality of capabilities shared among enterprises. Support and interaction may be provided from application to device and then to the end-to-end resource and performance management of the environment utilized. In various implementations of the disclosure of U.S. patent application Ser. No. 11/367,240, capability effectiveness assurance (CEA) may be provided at an application level. In some implementations of the present disclosure, CEA self-healing is provided that can cross enterprise boundaries. Additionally, specific core CEA capabilities may be off-loaded to separate enterprises, e.g., to maintain CEA across an integrated battle space.

Various implementations of the disclosure may provide self-healing of systems operating between multiple enterprises as well as the other systems operating within such enterprises. Such self-healing can be accomplished through management on a capability-by-capability basis while possible conflict and performance impacts to the overall environment are taken into account. Such self-healing can take place in real time under ad-hoc conditions, so that, e.g., an expected probability of success of a mission may be maintained.

In various implementations, a common framework is provided for healing and optimizing an NCO environment to assure capability effectiveness for a mission. A framework for NCO capability effectiveness assurance (CEA) includes a plurality of hierarchical capability levels (each level of which may also be referred to in this disclosure and in the claims as a "capability"): (1) interoperability, (2) information assurance, (3) data management, (4) knowledge management, and (5) collaboration in communities of interest. The capability levels (1) through (5) operate in a distinct hierarchical and dependent relationship. More specifically, a higher level requires the availability of capabilities provided by lower levels (if any) utilized. For example, information assurance (level 2) requires that interoperability (level 1) be operational first, so that an actual data link may be available via which information assurance activities may communicate. In the same or similar manner, capability level 3 requires availability of levels 2 and 1, and so on.

These capability levels, which are further described below, may be imposed on nodes, resources, and applications such that each node, resource, and/or application can be described in terms of the capabilities that they provide, and the capabilities that they require. In such manner, there can be a common frame of reference to plan an extent of capabilities needed from diverse enterprises, and dynamically assess cumulative capabilities in the NCO environment, e.g., during the course of a mission.

Figure 1:
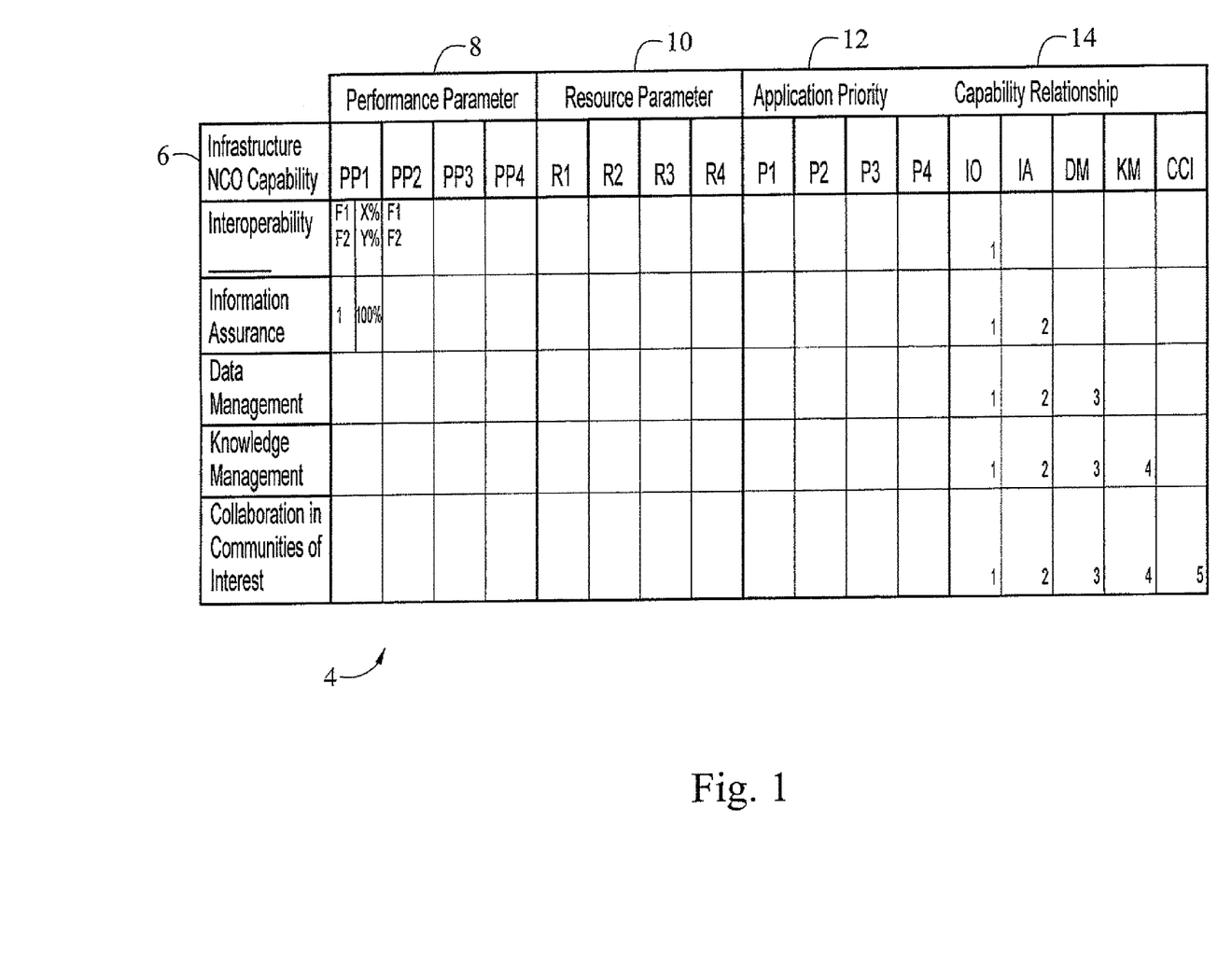
FIG. 1 is a diagram of a framework for capability effectiveness assurance in accordance with one implementation of the present disclosure.

A framework for capability effectiveness assurance is indicated generally in FIG. 1 by reference number 4. Each capability level 6 may be evaluated as to performance parameter(s) 8, resource parameter(s) 10, application priority(s) 12, and capability relationship(s) 14. Performance parameters 8 are customer-driven operational characteristics that may be, e.g., performance-focused or requirements-focused, that are measurable and that relate to a particular capability. In some implementations, a performance parameter may be derived from Key Performance Parameters (KPPs), e.g., Net-Ready Key Performance Parameters (NR-KPPs), as defined by the United States Department of Defense. Performance parameters utilized may be those that are anticipated to be key to evaluating the usability and availability of candidate capabilities during mission planning and during healing and optimization as further described below. For example, a performance parameter 8 may specify a type of support for integrated architecture products, information assurance accreditation, or compliance to a key interface profile. Performance parameters 8 are specified based, e.g., on operational needs of a mission and are used to determine whether a NCO environment in which the mission is to be performed meets capability needs of the mission.

Resource parameters 10 are basic resource criteria that identify real world constraints and needs of the associated capability. A resource parameter 10 may specify one of a wide variety of resources, including but not limited to CPU, storage, bandwidth, and I/O ports. It should be noted that resources can also include physical units. Thus a resource parameter 10 may specify, e.g., whether an NES encryption device is available to support information assurance requirements. Further, each capability 6 may require some measure of CPU/storage from available CPU/storage. After the required CPU/storage is analyzed for all capabilities 6, the remaining CPU/storage can be set aside for users. The resource parameters 10 may be a target of optimization across a capability 6. If capability resource parameters 10 can be minimized, more resource can be freed up for use. Application priority 12 provides a means to resolve contention between competing users for a finite amount of network resources at each particular capability level 6.

Information 14 regarding the relationship of one capability 6 to another capability 6 is specified. This hierarchical dependence, as previously described, is used to specify a particular order for analyzing capabilities to find solutions or optimize capability resources. The use of a particular analysis order can ensure that solutions at one capability level still support higher capability levels that depend on the lower capability level.

Figure 2:
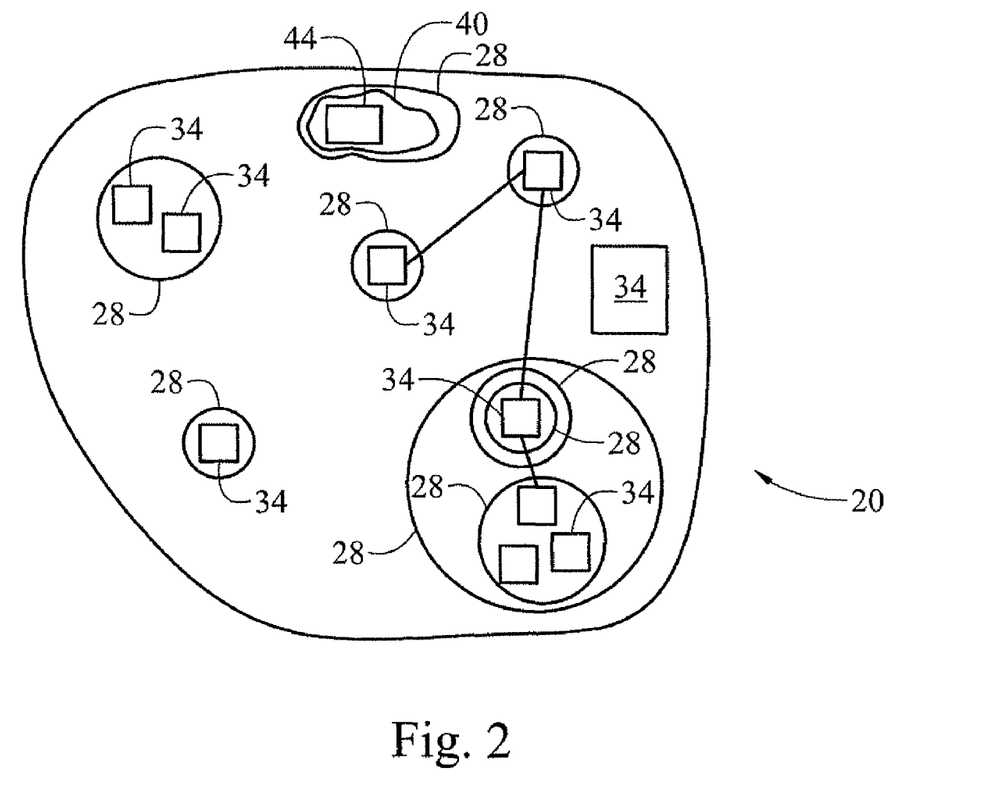
FIG. 2 is a diagram of a network-centric environment in accordance with one implementation of the present disclosure.

In various implementations, the disclosure is directed to systems for and methods of providing for self-healing and optimization of a network-centric environment. An exemplary network-centric environment is indicated generally in FIG. 2 by reference number 20 and shall hereinafter be referred to as a network. The network 20 includes a plurality of nodes 28 each capable of communicating with and/or being interrogated by one or more nodes 28 of the network. One or more nodes 28 may be ad hoc and/or mobile. At least one node 28 includes a system 40 that provides for self-healing and subsequent self-optimization, as further described below, in accordance with an implementation of the disclosure. The system 40 includes at least one computer 44 having a processor and memory configured to communicate with at least one other node 28. It should be noted that although the system 40 is shown in FIG. 2 as a single entity, the system 40 is typically distributed throughout the network 20 and is likely to be implemented at least in part using a plurality of ad-hoc nodes 28.

Unless otherwise indicated, the term "node" may include a network, a sub-network, a sub-node and/or an elemental node of a network, and the term "network" may include a sub-network, a system-of-systems, an enterprise (i.e., a network of networks) and/or a network-centric operations environment. It should be noted that various implementations are contemplated in connection with many types of multi-layered networks and NCO environments, and so the terms "node", "network", "system" and the like may be used interchangeably. An entity that connects to a level above itself may be referred to as a "node", e.g., by the higher-level network to which the connection is made. Thus, in some contexts, an application could be referred to as a "node".

The nodes 28 support one or more applications 34. As previously mentioned, a framework based on a set of network capabilities may be predefined for the network 20 and may be imposed on the network 20. Accordingly, in various implementations of the disclosure, a plurality of, e.g., substantially all, nodes 28 and applications 34 are implemented with reference to the same framework of predefined network capabilities. One or more of the predefined network capabilities may be attributed to a given application 34 and/or node 28 of the network 20. For example, a node 28 and/or application 34 may utilize, and thus be attributed with, one or more of the foregoing five capabilities, characterized as follows:

1) Interoperability: capability to connect, communicate, exchange, and understand information and operate together to achieve a common goal. Modeling of interoperability and its system impacts would take, e.g., the following aspects into consideration:
   (a) development and usage of standardized System of System (SoS) common NCO architectures and reference models, based around Open Systems Interconnection (OSI) layers and Internet Protocol (IP) utilizing common data communication methodologies and technologies addressing planned capability growth and obsolescence avoidance; and
   (b) information, communication and application interoperability;
   (c) minimum level(s) of communication between nodes and enterprises.

2) Information assurance: Assurance that a system can be relied on to provide data that is trustworthy and secure. Modeling of information assurance and its system impacts would take, e.g., the following aspects into consideration:
   (a) providing for measures that protect and defend information and information systems by ensuring their availability, integrity, authentication, confidentiality and non-repudiation;
   (b) providing for restoration of information systems by incorporating protection, detection, and reaction capabilities;
   (c) methodologies for authorization, verification, detection and defense of a NCO system operating in a multiple-level security (MLS) environment.

3) Data management: Capability to store, share, organize, retrieve and distribute understandable information and its importance and implications of information to achieve a goal. Modeling of data management and its system impacts would take, e.g., the following aspects into consideration, to allow for identification of common data sharing modes and/or formats supported and/or currently utilized:
   (a) development of information dissemination management systems for intelligent data-centric driven knowledge creation and conversion of data to knowledge before presentation to user via a seamless and/or intuitive human interface to address standard human interface for device/system type, man-machine interface, NCO human factors, and common/standard device interface for device/system type;
   (b) understanding of tools for automatic analysis of developed data alignment, commonality verification, completeness and comparison; development and retrieval of lessons learned, and basic knowledge management;
   (c) understanding of ontology and lexicon (including common format, metadata, language translation, vocabulary development) as applied to NCO knowledge management including bridging methodologies to harmonize different ontologies.

4) Knowledge management: Ability to locate and obtain information with or without prior knowledge of its location or ownership. Modeling of knowledge management and its system impacts would take, e.g., the following aspects into consideration, to allow for identification of common knowledge sharing methodologies supported and/or currently utilized:
   (a) registration (ad hoc and a priori) in a system of systems (SoS) environment, with system and node level differentiation discussions;

(b) in a system of systems (SoS) environment, with system and node level differentiation discussions, discovery (such as publish and subscribe, smart pull/smart push, information brokerage, handle-information-only-once), failure mode, criticality analysis, and systemized risk assessment.

5) Collaboration in communities of interest: Ability for users, across systems and systems of systems, to collaborate, e.g., in two types of groups of common interest: birds of a feather groups (subject matter experts) and groups focused on completing a specific task who locate and obtain information with or without prior knowledge of its location or ownership.

In various implementations of the present disclosure, capability effectiveness assurance (CEA) may be provided with reference to the foregoing capability framework. CEA is a capability to acquire information and services from a plurality of sources across a network, system and/or system-of-systems, e.g., to enable mission completion in a mutually optimized manner across the network, system and/or system-of-systems, and to provide for ad-hoc self-healing across the network, system and/or system-of-systems. Reference is made to U.S. patent application Ser. No. 11/367,240, entitled "Supporting Effectiveness of Applications in a Network Environment", the disclosure of which is incorporated herein by reference in its entirety. In patent application Ser. No. 11/367,240, methods and systems are described whereby network applications may negotiate with one another to obtain network resources.

In various implementations of the present disclosure, each application 34 is configured to implement one or more capability of the foregoing capability framework subject to one or more performance parameters predefined for the application capability(s). In various implementations and as further described below, performance parameters may be predefined based, e.g., on Key Performance Parameters (KPPs) provided by the U.S. Department of Defense (DoD). Additionally, each application 34 and/or node 28 is configured to negotiate, as to each of its capability(s), with the nodes 28 for a network resource such as processing, storage, bandwidth and/or input/output (I/O) ports to support the application capability(s) in accordance with one or more performance parameters. Each node 28 is configured to negotiate, as to each capability in the framework, with the applications 34 and other nodes 28 to optimize network resource allocation to the applications 34 and to the other nodes 28. Resource optimization thus can be performed on an ad-hoc basis, across network boundaries and between layers of networks.

In an ad-hoc network environment, the allocation and use of resources can be subject to rapid change. Competition for network resources among nodes with different levels of resource priorities could result in unexpected shortages of one or more network resource. In various implementations of the disclosure, in the event, e.g., of a reduction in one or more network capabilities of a given application 34, the reduction may be automatically addressed in the network environment to allow the application 34 to be implemented. Nodes may negotiate in the network-centric environment, e.g., with next-level environment master registration modules, to resolve the capability change, until, e.g., based on a probability of effectiveness associated with the given application 34, the application is provided with one or more network resources resolving the capability change. Negotiation may include the changing (e.g., reduction) of one or more priorities associated with the given application 34, for example, if desired by a mission approval authority that originally assigned the associated priorities. The application 34 may be terminated, e.g., by a mission authority or an environment register module (if so enabled), if critical resources are not available to resolve the change or if resources are available but do not satisfy a priority assigned to the application.

For an application 34, each framework capability attributed to the application may be conditioned by one or more performance parameters specific to the application and to the capability. A performance parameter conditions activity of an application or standalone node by, e.g., defining a critical operational capability of the application or node. A performance parameter thus may be expressed, e.g., in terms such as "bandwidth supported" or "sensor detection range".

For example, and referring to FIG. 1, where an application 34 is for an ability to send voice-over-Internet Protocol (VoIP), two of the foregoing network capabilities may be attributed to the application: (1) interoperability and (2) information assurance. A first interoperability performance parameter PP1 may be used to specify a connection type that the application/host device can support. There could be, for example, two connection options for the VoIP application 34, each of which may be referred to as a "functionality level": F1, e.g., a satellite phone connection, and/or F2, e.g., an FM line-of-sight transceiver connection. In the present example, functionality level F1 has a probability of effectiveness of x % and functionality level F2 has a probability of effectiveness of y %. A probability of effectiveness may be defined as a probability that a capability (in this case, interoperability) can achieve a desired result. A second interoperability performance parameter PP2 may be used to specify bandwidth(s) supported using the foregoing two functionality levels.

For the information assurance capability for the present exemplary VoIP application 34, there may be one performance parameter: whether or not a user has the correct password to allow access to other VoIP application(s). Thus the performance parameter PP1 specifies "1" and a probability of effectiveness of 100%, indicating that where the user has the correct password, there is projected to be a 100% probability of effectiveness with respect to information assurance for the VoIP application 34. The exemplary VoIP application 34 would not utilize the higher-order capabilities, i.e., data management, knowledge management, and collaboration of communities of interest. It should be noted that a wide variety of performance parameters could be defined.

In various implementations of the disclosure, each application 34 and/or node 28 has its own control matrix in which various values may be tracked. An exemplary control matrix is indicated generally in FIG. 3 by reference number 100. As further described below, a control matrix 100 for an application 34 may be used differently from a control matrix 100 for a node 28.

In the present exemplary implementation, performance parameters are predefined based on Net-Ready Key Performance Parameters (NR-KPPs) provided by the U. S. Department of Defense (DoD). As known in the art, KPPs are measurable, testable, or calculable characteristics and/or performance metrics required for timely, accurate and complete exchange and use of information. The KPPs may be based, e.g., on Key Interface Profiles (KIPs). It should be understood, however, that other or additional types of performance parameters could be used in various implementations.

Figure 3:
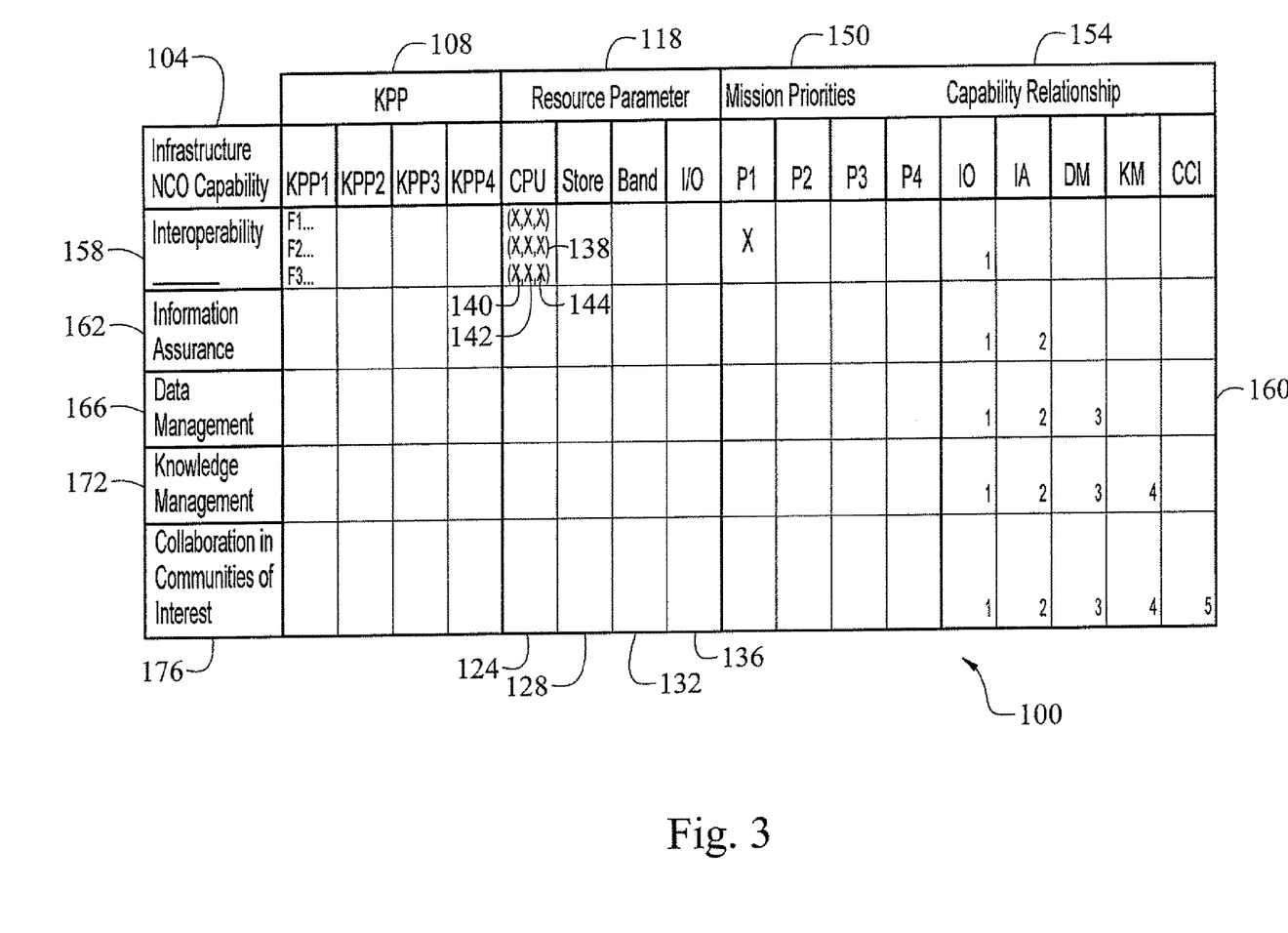
FIG. 3 is a control matrix in accordance with one implementation of the present disclosure.

In the present exemplary implementation, up to four performance parameters 108 may be provided for each capability 104. Additionally or alternatively, more than or less than four performance parameters could be used in various implementations, although using more than four performance parameters might require, e.g., additional processing time. As shown in FIG. 3, one performance parameter 108 for interoperability includes three functionality levels F1, F2 and F3. Although other performance parameters 108 for interoperability and other capabilities 104 may also specify functionality levels, only interoperability performance parameter KPP1 is shown for clarity.

For each capability 104, resource parameters 118 indicate resource usage by the application. Availability of resources may be updated substantially continuously as conditions change. For the present exemplary matrix 100, resource parameters 118 are included for processing 124, storage 128, bandwidth 132, and input/output (I/O) ports 136. For a given capability 104, the resource parameters 118 for each resource may indicate a range 138 of values, e.g., a minimum value 140, an average value 142, and a maximum value 144 of each identified resource of the network 20 required to operate every sub-capability of the given capability 104 utilized by the application 34 and/or node 28. Accordingly, values included in the resource parameters 118 may represent, e.g., physical units such as gigabytes of storage or megabits of bandwidth.

As shown in FIG. 3, only one resource parameter 118, i.e., for interoperability processing, is indicated for clarity. The three processing ranges 138 support the interoperability KPP1 functionality levels F1, F2 and F3 respectively. Other types of values also are contemplated and may vary widely in accordance with a wide variety of types of resources that may be specified in various implementations. In the present exemplary implementation, up to four resources 118 per capability 104 per application 34 may be specified. Other numbers of resources are possible, although specifying more than four resources may, e.g., increase processing time in the network.

It should be noted generally that a capability is provided by the sum of its sub-capabilities. Thus "sub-capability" may be used to refer, for example, to interoperability utilized by one application 34 of a node 28 having two applications 34, while "capability" may refer to total interoperability utilized by the node, i.e., interoperability utilized by both applications. Similarly, interoperability utilized by one (a "first") node 28 may be a sub-capability of a second node of which the first node is a sub-node. The term "capability" may be used in this disclosure and in the claims to refer to a sub-capability and/or a capability.

Each capability 104 may be assigned one or more priorities 150. A priority 150 is applicable to, and in the present implementation, corresponds to, a resource. Thus, referring to FIG. 3, priority P1 is applicable to CPU, and priority P2 is applicable to storage. A relationship hierarchy 154 is defined among the NCO capabilities 104, to specify an order in which the capabilities 104 are evaluated, e.g., in negotiation for resources as further described below. It can be appreciated by those knowledgeable in the art that the order of the hierarchy 154 reflects relative dependencies intrinsic to the capabilities 104. For example, interoperability 158 is first in the hierarchy 154 since interoperability is the ultimate basis from which all of the higher-level four capabilities depend. It can be seen that information assurance 162 depends on interoperability 158, data management 166 depends on information assurance 162, knowledge management 172 depends on data management 166, and collaboration in communities of interest 176 depends on knowledge management 172. In other words, all higher-order NCO capabilities require at least interoperability 158, and possibly additional intermediary capabilities 104, to provide their capabilities. Accordingly, each row 160 in the capability relationship hierarchy 154 indicates an iteration sequence for self-healing and/or optimization, further described below, for the corresponding capability 104.

A node 28 and/or application 34 may monitor an application control matrix 100 in order to detect changes, if any, in availability of resources 118 supporting one or more application capabilities 104. If no change is detected, the application 34 may continue to execute. If a change in a capability resource 118, e.g., a loss of data, a line drop, etc., is detected, the node 28 may first verify conditions required to maintain a required probability of effectiveness for the affected application 34. Various implementations of probabilities of effectiveness are described in U.S. patent application Ser. No. 11/367,240, entitled "Supporting Effectiveness of Applications in a Network Environment", the disclosure of which is incorporated herein by reference in its entirety.

If the change is determined not to unacceptably reduce a required probability of effectiveness, the affected application 34 may continue to execute, even though one of its resources 118 might be diminished. In other implementations, it may be assumed that any detected change would be unacceptable. If, e.g., a probability of effectiveness has dropped to an unacceptable level, the node 28 and/or application 34 may proceed to identify the change(s). Identification begins at the lowest capability (e.g., interoperability 158) and proceeds through all additional capabilities 104 (if any) of the application 34 to determine a cause for the capability change.

An example shall now be described relative to an application 34 that uses a streaming video feed to supply data. The application utilizes two capabilities: interoperability and information assurance. Where a node 28 upon which the application is running has determined, e.g., from resource parameters 118 of a matrix 100 for the application, that a capability of the application 34 is no longer functioning, the node 28 begins at the lowest capability (interoperability 158) to determine whether, e.g., a raw feed for the application 34 is working. If the raw feed is not working, the node 28 has found the source of the change. If the feed is working, the node 28 proceeds to check information assurance 162, e.g., to check whether the application has access to a needed level of encryption. If a needed access is not available, the node 28 identifies the lack of availability as the source of the capability change. When the change has been identified, the node 28 commences a self-healing process in the following manner.

Generally, the application host node 28 may negotiate in the network-centric environment to resolve the change. Reference is made to U.S. patent application Ser. No. 11/367,240, entitled "Supporting Effectiveness of Applications in a Network Environment", the disclosure of which is incorporated herein by reference in its entirety. In patent application Ser. No. 11/367,240, methods and systems are described whereby network applications may negotiate with one another to obtain network resources. In various implementations of the present disclosure, negotiating may be performed among nodes 28 for various applications 34 of the network 20 until, based on a probability of effectiveness, a given application 34 is provided with one or more network resources resolving, i.e., "healing", a change detected in the given application's capabilities.

It should be noted that for each capability 104 relative to which negotiation takes place, a healing resolution proposed through negotiation is required to be in accordance with (a) one or more performance parameters 108 applicable to that capability, and (b) one or more priorities 150 applicable to that capability. It also should be noted that negotiating among nodes 28 and/or applications 34 takes place in accordance with the predefined capability hierarchy 154, to ensure that a resolution of a capability change supports any and all capabilities 104 underlying a capability 104 for which the resolution is proposed. Thus negotiation begins with reference to the highest capability 104 for which resolution is sought and is repeated for each underlying capability. (Where a resolution is sought only at the interoperability level, there is no underlying capability to check.)

Consider an exemplary application, e.g., an encryption device that utilizes only two NCO capabilities, interoperability 158 and information assurance 162, and that is determined to be no longer transmitting. Self-healing may take place as described in the flow diagram generally referred to in FIG. 4 by reference number 200. It is determined in step 208, e.g., by a node 28 hosting an application 34 using the device, that the device is disabled due to a problem at the information assurance capability level. In step 212 the host node 28 negotiates with other nodes 28 at the same network level for a replacement resource (in this case, another encryption device) and locates a possible replacement device. In step 216 it is determined whether the proposed replacement device meets the disabled device KPP 108 requirements at the information assurance capability level 162. If the information assurance KPPs for the replacement device are not acceptable, then in step 212 negotiation continues until another possible replacement device is located. If in step 216 the information assurance KPPs for the replacement device are determined to be acceptable, then in step 220 information assurance priorities 150 for the replacement device are compared with those of the disabled device. If the replacement device information assurance priorities 150 are not acceptable, then in step 224 the host node 28 determines, e.g., by a request to a human commander, whether a lower priority would be acceptable or a higher priority might be assigned. If not, then negotiation may resume in step 212.

Figure 4:
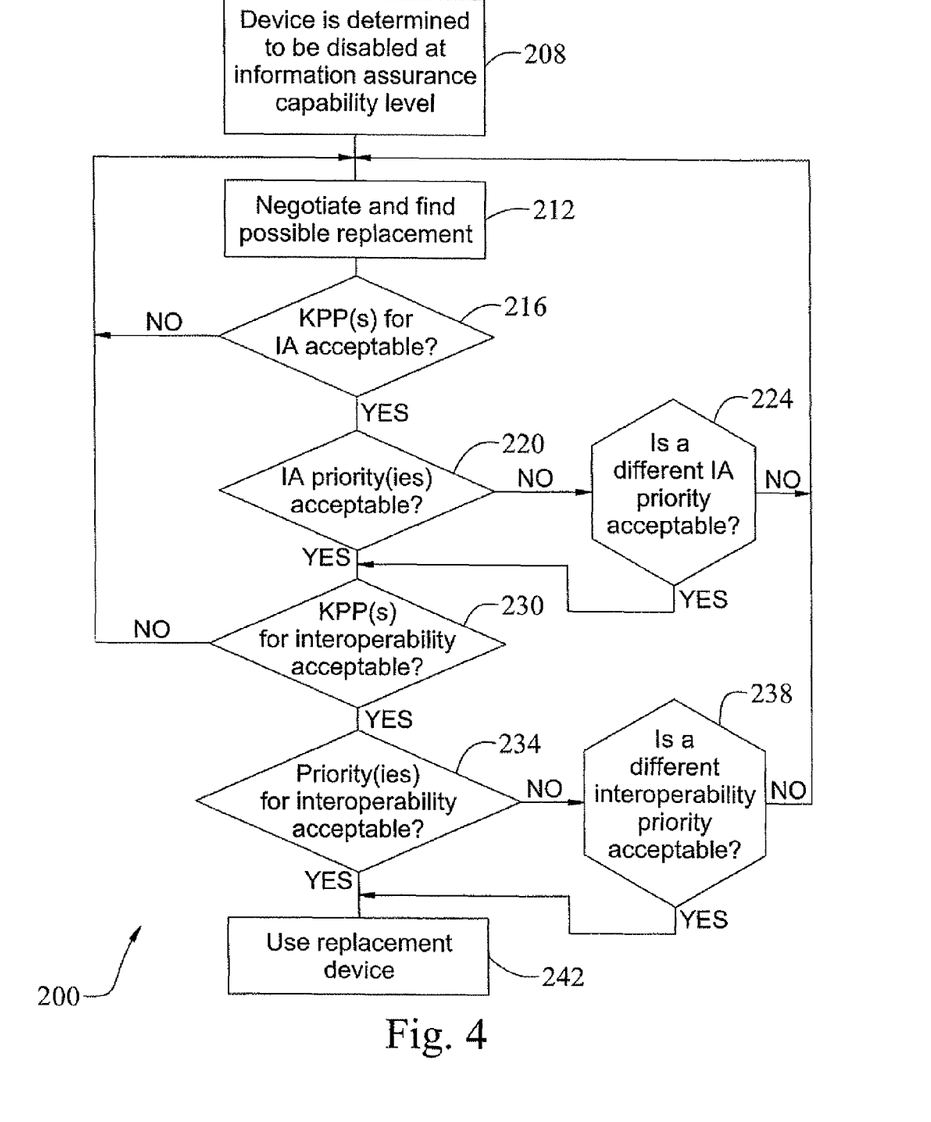
FIG. 4 is a flow diagram of a method of performing self-healing in accordance with one implementation of the present disclosure.

If the replacement device information assurance priorities 150 are acceptable, then any underlying capabilities (in this case, only interoperability 158) remain to be checked, to complete the determination as to whether the proposed device is acceptable. Accordingly, in step 230 it is determined whether the proposed replacement device meets the disabled device KPP 108 requirements at the interoperability capability level 158. If the interoperability KPPs for the replacement device are not acceptable, then negotiation may continue in step 212 until another possible replacement device is located.

It should be noted generally that it may be possible to propose a reduction in KPP functionality level as a possible healing solution, although such a reduction might not be acceptable depending on the particular application for which healing is sought. If in step 230 the interoperability KPPs for the replacement device are determined to be acceptable, then in step 234 interoperability priorities 150 for the replacement device are compared with those of the disabled device. If the replacement device interoperability priorities 150 are not acceptable, then in step 238 the host node 28 determines, e.g., by a request to a human commander, whether a lower priority would be acceptable or a higher priority to access the resource could be assigned. If not, then negotiation may resume in step 212. Although not shown in FIG. 4, negotiation (and possibly the application 34 needing the encryption device) may be terminated if a required probability of effectiveness is determined not to be met. If interoperability priorities 150 are acceptable, then in step 242 the replacement device may be deemed appropriate for use by the application.

Numbers of iterations are determined by capability. Where, e.g., a resolution is sought at the communities-of-interest capability level 176, five iterations, one for each capability 104, would be performed (as indicated in the communities-of-interest row 160 of the hierarchy 154) instead of the foregoing two iterations shown in FIG. 4. Similarly, where a resolution is sought at the knowledge management capability level 172, four iterations would be performed (in the order indicated in the knowledge management row 160 of the hierarchy 154). It should be noted that in various implementations, the foregoing self-healing process can take place across network boundaries and network layers.

When a node 28 detects a change, for example, caused by the transfer of the encryption device to the host node 28 as previously described with reference to FIG. 4, network optimization may be triggered. Generally, each node 28 may use a control matrix 100 to track changes for all of its hosted applications 34. A host node 28 may evaluate its resource usage (collective or for a given hosted application) to determine whether to perform optimization. This evaluation may be performed through ad hoc modeling of the network 20 by each capability, at the application level.

Figure 5:
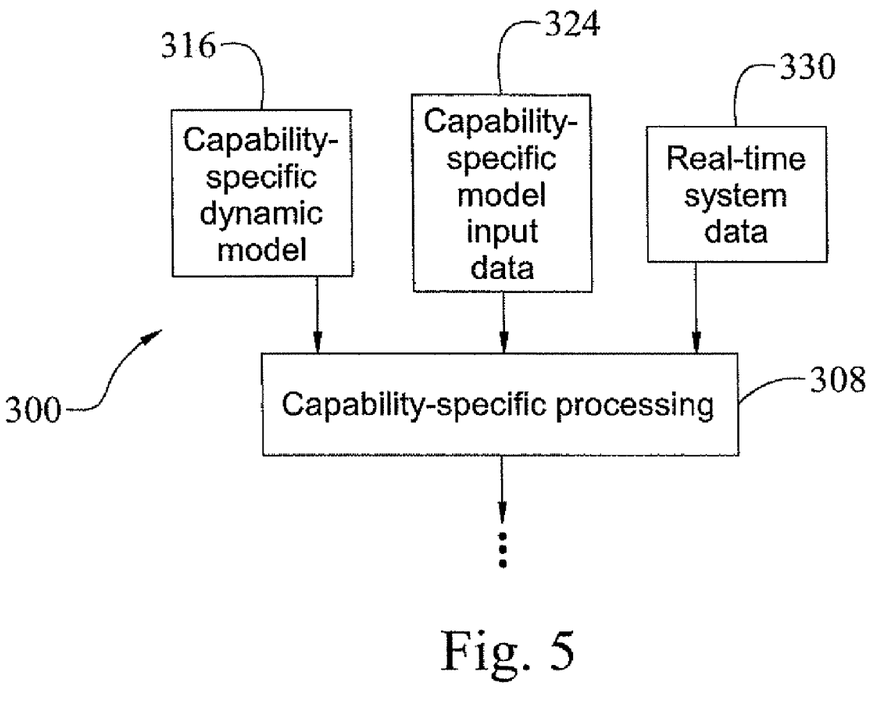
FIG. 5 is a diagram of ad-hoc modeling in accordance with one implementation of the present disclosure.

A simplified diagram of ad-hoc modeling is indicated generally in FIG. 5 by reference number 300. Inputs to capability-specific processing 308 include a capability-specific dynamic model 316, capability-specific model input data 324, and real-time system data 330. In capability-specific processing 308, real-time system data 330, e.g., sampled from activity of a given application 34, may be evaluated relative to data produced using the dynamic model 316 and model input data 324. As further described below, one or more performance parameters, which are specific to a given application and to a given capability, condition activity of the application and are used as criteria for evaluating the activity of that application on a capability-specific basis.

Figure 7A:
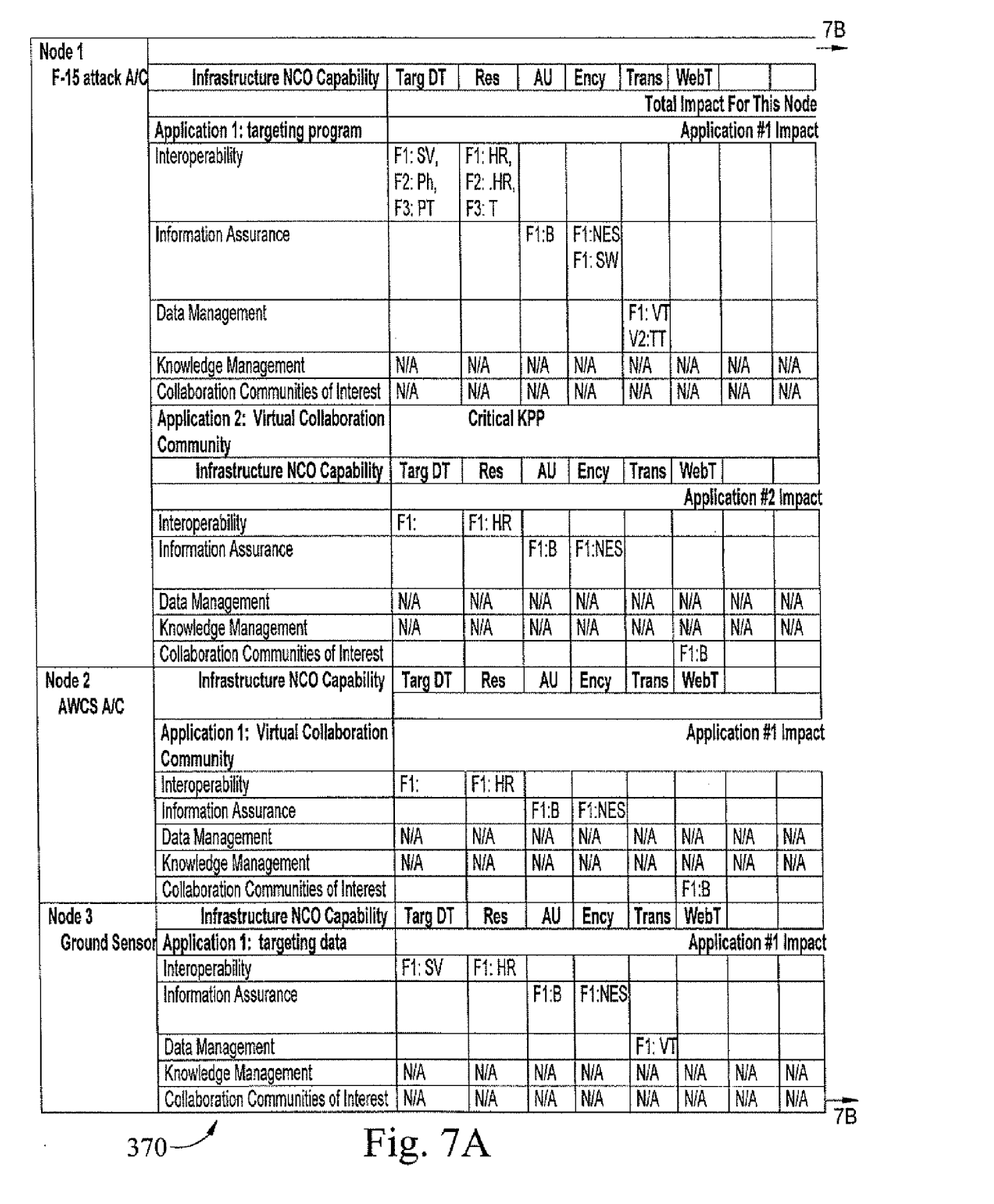
FIG. 7A is a first portion of a control/resource matrix in accordance with one implementation of the present disclosure.

Network optimization may be performed by substantially constant ad-hoc negotiation among nodes, between their controlling environment register modules, to optimize all capabilities. The network 20 includes at least one master resource matrix of a master register module for use in resource utilization management. A master resource matrix may be configured based on resource needs of each NCO core capability in the network 20. A master resource matrix may be configured as specific to a particular network level. Additionally or alternatively, a master resource matrix may reflect a plurality of network levels. One example of a master control/resource matrix is indicated generally in FIGS. 7A and 7B by reference number 370.

As resources are balanced during network optimization, for each NCO capability that uses the same resource, e.g., RAM, that resource usage, e.g., RAM usage, is summed with that of usage by all other capabilities requesting that resource. Summing is performed for three usage levels: (1) summing of all minimum resources to operate that capability at a lowest functional level (which may be too low); (2) summing of nominal operating resource requirements for a functional level currently planned for use; and (3) summing of worst-case resource requirements, that is, the highest requirements based on an extreme functionality level. This summing may be tracked in a matrix for each resource parameter 118, for example, for RAM as shown in Table 1. Each additional resource being balanced has a matrix similar to that shown in Table 1.

TABLE 1

Resource parameter matrix for RAM.

|  | Minimum | Nominal | Maximum |
| --- | --- | --- | --- |
| Interoperability | 2 | 3 | 4 |
| Information Assurance | 3 | 3 | 4 |
| Data management | 5 | 7 | 8 |

TABLE 1-continued

Resource parameter matrix for RAM.

|  | Minimum | Nominal | Maximum |
|---|---|---|---|
| Knowledge management | 6 | 7 | 9 |
| Collaboration in communities of interest | 3 | 3 | 6 |
| Totals | 19 | 20 | 31 |

Thus an exemplary range of all resource requirements for RAM is given by ($19_{min}$, $20_{nominal}$, $31_{worst\ case}$). This range may be compared to actual resources currently available, say, 24 units. In the present example, the network could operate with this proposed solution, but only if it tags the solution to let the requesting capabilities know they must run at a restricted level, since the worst case solution exceeds current available resources. If this proposal allows, e.g., an application success probability above a predefined minimum, this resource optimization may be accepted and control proceeds to the next resource for balancing. Generally, proposals may be conveyed back and forth, e.g., between interconnected network levels until a solution that fits all identified resources is shown to also support a final closed-set optimization solution. Negotiation may be performed up a network chain, but a proposed solution is confirmed at each applicable capability level lower than the one at which the solution is proposed. Cross communication may be managed, e.g., by a master control module which handles all inter-module communication.

Continuing a previous example, when an encryption device application 34 is running in the network 20, it utilizes network resources, e.g., processing, bandwidth, storage and/or one or more I/O ports. In the present exemplary implementation, network resource usage by the encryption device application 34 is sampled and evaluated with reference to each of the two capabilities of the application 34. For example, resource utilization data for the application 34 is input first to interoperability-specific ad-hoc modeling and interoperability-specific processing for the application 34 as previously described with reference to FIG. 3. Interoperability-specific KPPs 108 are used as criteria for evaluating the resource utilization. The resource utilization data then is input to information assurance-specific ad-hoc modeling and information assurance-specific processing for the application 34, and information assurance-specific KPPs are used as criteria for evaluating the resource utilization. The resource parameters 118 of the application control matrix 100 are updated to reflect static and dynamic modeling and capability processing results. In such manner, network resource usage by the application 34 can be apportioned among the application's network capabilities.

Figure 6:
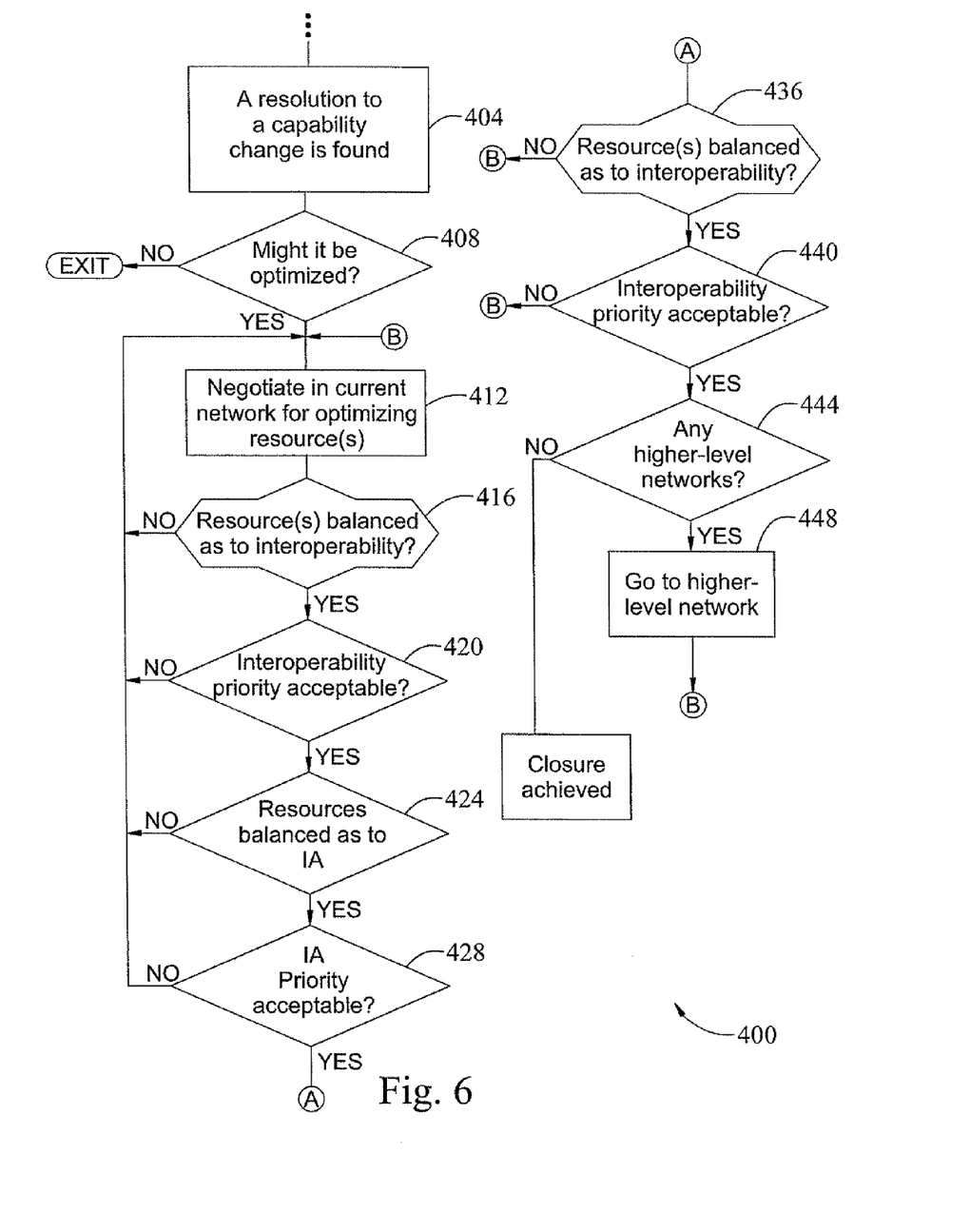
FIG. 6 is a flow diagram of a method of optimizing a network in accordance with one implementation of the present disclosure.

A node 28 may perform optimization in accordance with one implementation of a method indicated generally in FIG. 6 by reference number 400. In step 404, it is determined that a healed resolution to a capability change has been found (and may have been found in another network.). In step 408, the node 28 uses matrix 100 data and the foregoing modeling process(es) to determine whether the resolution can be optimized. If yes, then in step 412 the node 28 seeks and negotiates for appropriate optimizing resource(s) in the network 20. When such resource(s) are proposed, the node 28 in step 416 performs balancing of the proposed resource(s) through interoperability-specific static and dynamic modeling as previously described. If the resources are balanced, then in step 420 it is determined whether the balanced resource(s) have an acceptable interoperability priority. If no, then control returns to step 412 and further negotiations are performed. If the interoperability priority is acceptable, then in step 424 the node performs balancing of the proposed resource(s) through information-assurance-specific static and dynamic modeling as previously described. If the resources are not balanced, then control returns to step 412 and further negotiations are performed. If the resources are balanced, then in step 428 it is determined whether the balanced resource(s) have an acceptable information assurance priority. If no, then control returns to step 412 and further negotiations are performed. If the information assurance priority is acceptable, then in steps 436 and 440 a second iteration of interoperability processing is performed, as it was in steps 416 and 420. It should be noted that numbers of iterations are determined by capability. Where, e.g., a resolution is sought at the data management capability level 176, data management processing would be performed after interoperability processing and information assurance processing as shown in steps 416, 420, 424 and 428. Upon successful performance of data management processing, information assurance processing would again be performed, followed by interoperability processing.

It should be noted that in various implementations, the present optimization process takes place across network boundaries and network layers. In step 444, it is determined whether optimization is to be performed in a higher-level network that includes the network 20 as a node. If yes, then negotiation is performed in steps 448 and then 412 with the higher-level network. If in step 448 it is determined that there are no higher-level networks, then closure of optimization is determined to have been achieved.

The foregoing methods and systems define a capability framework for self-healing and network optimization, thereby addressing network health issues, including but not limited to degraded performance. Various implementations can provide an ability to locate and reacquire lost assets and other resources, and to quickly reconstruct an application on the fly using allocated and reallocated resources. On-the-fly resource allocation and balancing can be performed. Commander input at substantially all enterprise levels can be minimized under combat conditions, and probability of success running real-time applications over networks can be enhanced.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of managing a network including a plurality of nodes and a plurality of applications of the nodes, the method comprising:

predefining interoperability as a first capability of an ordered relationship hierarchy of network capabilities providable by the applications, and predefining each of the other network capabilities as dependent on one or more preceding capabilities in the hierarchy;

attributing one or more of the predefined capabilities to each of the applications;

configuring each of the applications to negotiate, as to each of the one or more network capabilities attributed to the application, with the nodes to obtain a network resource to support the one or more capabilities attributed to the application, the negotiating performed in a sequence determined by the hierarchy; and configuring each node to negotiate, after an application obtains a network resource, with other nodes to optimize network resource allocation, the negotiating performed to obtain a resolution of a change in a network capability such that the resolution supports any and all capabilities provided in the network and upon which the changed network capability is dependent.

2. The method of claim 1, wherein configuring each node to negotiate to optimize network resource allocation comprises configuring each node to negotiate, as to each network capability attributed to the node, with the other nodes in a sequence determined by the hierarchy.

3. The method of claim 1, wherein configuring each node to negotiate to optimize network resource allocation comprises configuring each node to use modeling of each of the network capabilities attributed to the node to evaluate resource allocation to each of the network capabilities attributed to the node.

4. The method of claim 1, wherein a plurality of the nodes are ad-hoc nodes.

5. The method of claim 1, further comprising configuring each node to: begin negotiation with another node with reference to a highest one of the capabilities for which the node seeks a network resource; and continue the negotiation with reference to each capability underlying the highest one of the capabilities for which the node seeks a network resource.

6. The method of claim 1, wherein each of the applications is configured to implement one or more of the capabilities subject to one or more predefined capability-specific performance parameters, the method comprising configuring the nodes to obtain a network resource to support the one or more capabilities in accordance with one or more of the one or more performance parameters.

7. The method of claim 1, further comprising predefining the other network capabilities of the hierarchy as information assurance, data management, knowledge management, and collaboration in communities of interest.

8. A network comprising:
a plurality of nodes and a plurality of applications of the nodes, each node and application configured in the network with reference to a framework predefining an ordered relationship hierarchy of network capabilities providable by the applications, in which at least the lowest-order network capability is required by higher-ordered network capabilities in the hierarchy, each application being attributed with one or more of the network capabilities;

each application having a control matrix based on the framework and in which network resources being used by the one or more of the network capabilities attributed to the application are monitored specifically as to each of the one or more network capabilities attributed to the application as the application executes in the network;

each application further configured to implement one or more of the network capabilities attributed to the application subject to one or more performance parameters defined for the one or more network capabilities attributed to the application;

each node further configured to:
negotiate, as to each of the network capabilities attributed to the node via applications of the node, with other nodes to obtain network resources to support one or more of the network capabilities attributed to the node in accordance with one or more of the one or more performance parameters; and negotiate, as to each network capability attributed to the node, with other nodes to optimize network resource allocation across the network after a network resource is obtained.

9. The network of claim 8, wherein each node is configured to use modeling of the predefined network capabilities attributed to the node to evaluate resource allocation to each capability.

10. The network of claim 9, wherein each node is configured to use the modeling to obtain static and dynamic balance of the resources.

11. The network of claim 8, wherein each node is configured to evaluate a priority associated with one of the capabilities to optimize the network resource allocation.

12. The network of claim 8, wherein the network capabilities of the hierarchy are predefined as interoperability, information assurance, data management, knowledge management, and collaboration in communities of interest.

13. A network comprising:
a plurality of nodes and a plurality of applications of the nodes, each node and application configured in the network with reference to a framework predefining an ordered relationship hierarchy of network capabilities providable by the applications, in which at least the lowest-order network capability is required by higher-ordered network capabilities in the hierarchy, each application being attributed with one or more of the network capabilities;

each node having a control matrix based on the framework and in which network resources being used by the one or more of the network capabilities attributed to applications of the node are monitored specifically as to each of the one or more network capabilities attributed to the node as the applications execute in the network;

each application further configured to implement one or more of the capabilities attributed to the application subject to one or more performance parameters defined for the one or more capabilities attributed to the application;

each node further configured to:
for each capability attributed to applications of the node, determine a cumulative value of resource allocation to the applications of the node specific to each of the attributed capabilities; and negotiate, for and specific to each capability attributed to the node via applications of the node, with other nodes to optimize the cumulative values for all of the nodes.

14. The network of claim 13, wherein each node is further configured to modify a functionality level of an application to optimize the cumulative value.

15. The network of claim 13, wherein each node is further configured to modify usage of a resource to optimize the cumulative value.

16. The network of claim 15, wherein the resource is one of bandwidth, storage, processing and an input/output port.

17. The network of claim 13, wherein each application is further configured to negotiate with a node that includes the application for a change in allocation of a resource to a capability attributed to the application in accordance with the one or more performance parameters.

18. A method of optimizing a network including a plurality of applications, the method comprising:
predefining interoperability as a first capability of an ordered relationship hierarchy of network capabilities providable by the applications, and predefining each of the other network capabilities as dependent on one or more preceding capabilities in the hierarchy;

attributing one or more of the predefined capabilities to each of the applications;

for each application, specifying one or more performance parameters for each capability attributed to the application from the hierarchy of capabilities;

for each application and for and specific to each attributed capability, one or more nodes of the network making available one or more network resources to the application;

for each capability in the hierarchy, one or more nodes of the network determining a cumulative value of resource usage across the network for each network resource assigned to the applications; and for one capability in the hierarchy, one or more nodes of the network modifying a functionality level of one of the performance parameters to optimize the cumulative value.

19. The method of claim 18, further comprising using capability-based modeling to determine the cumulative value of resource usage.

20. A method of optimizing a network having a plurality of applications hosted on a plurality of nodes, the method performed by the nodes and comprising:

attributing one or more network capabilities to the applications from a framework predefining an ordered relationship hierarchy of network capabilities providable by the applications, in which at least the lowest-order network capability is required by higher-ordered network capabilities in the hierarchy;

for each of the applications, identifying one or more performance parameters for each network capability attributed to the application and assigning one or more functionality levels for each network capability attributed to the application;

negotiating for a resource with applications and nodes in the network to acquire the resource for a selected capability of a given application based on each performance parameter identified for the selected capability, one of the functionality levels assigned for the selected capability, and a priority corresponding to the resource and to the selected capability; and negotiating, as to each attributed capability in the framework, with the applications and nodes to optimize allocation of resources across the network;

the negotiating performed in iterations the numbers of which are determined based on the order of the capabilities in the ordered relationship hierarchy.

* * * * *